United States Patent
Hara et al.

(10) Patent No.: US 12,509,193 B2
(45) Date of Patent: Dec. 30, 2025

(54) AUTONOMOUS CRUISING SYSTEM, NAVIGATIONAL SIGN IDENTIFYING METHOD, AND NON-TRANSITORY COMPUTER-READABLE MEDIUM

(71) Applicant: Furuno Electric Co., Ltd., Hyogo (JP)

(72) Inventors: Yuichi Hara, Sakai (JP); Katsuo Yamada, Nishinomiya (JP)

(73) Assignee: Furuno Electric Co., Ltd., Hyogo (JP)

( * ) Notice: Subject to any disclaimer, the term of this patent is extended or adjusted under 35 U.S.C. 154(b) by 197 days.

(21) Appl. No.: 18/339,935

(22) Filed: Jun. 22, 2023

(65) Prior Publication Data
US 2023/0331357 A1 Oct. 19, 2023

Related U.S. Application Data

(63) Continuation-in-part of application No. PCT/JP2021/042612, filed on Nov. 19, 2021.

(30) Foreign Application Priority Data

Dec. 24, 2020 (JP) .................. 2020-215313

(51) Int. Cl.
*B63B 49/00* (2006.01)
*B63B 79/10* (2020.01)
(Continued)

(52) U.S. Cl.
CPC .............. *B63B 49/00* (2013.01); *B63B 79/10* (2020.01); *B63B 79/40* (2020.01); *G01C 21/203* (2013.01);
(Continued)

(58) Field of Classification Search
CPC ......... B63B 49/00; B63B 79/10; B63B 79/40; G01C 21/203; G06T 7/70; G06V 10/764; H04N 23/69; H04N 23/695
See application file for complete search history.

(56) References Cited

U.S. PATENT DOCUMENTS 9,207,675 B1 * 12/2015 Walser ............... G01C 21/3807
2002/0105432 A1 * 8/2002 Pederson ................ G09F 21/04
340/815.45

(Continued)

FOREIGN PATENT DOCUMENTS

| JP | H0476562 A | 3/1992 |
| JP | 2014206452 A1 | 10/2014 |

(Continued)

OTHER PUBLICATIONS

ISA Japan Patent Office, International Search Report Issued in Application No. PCT/JP2021/042612, Dec. 21, 2021, WIPO, 4 pages.

(Continued)

*Primary Examiner* — Keith D Bloomquist
(74) *Attorney, Agent, or Firm* — Alleman Hall & Tuttle LLP

(57) ABSTRACT

The present disclosure provides an autonomous cruising system capable of improving an accuracy of identifying description of a sign. The autonomous cruising system includes processing circuitry. The processing circuitry acquires a first image including a buoy from a camera installed in a ship. The processing circuitry identifies a position of the buoy inside the first image. The processing circuitry acquires a second image corresponding to a partial area of the first image including the position of the buoy, and the second image is higher in resolution than the first image. The processing circuitry identifies description of a sign of the buoy based on the second image.

20 Claims, 14 Drawing Sheets

(51) Int. Cl.
*B63B 79/40* (2020.01)
*G01C 21/20* (2006.01)
*G06T 7/70* (2017.01)
*G06V 10/764* (2022.01)
*H04N 23/69* (2023.01)
*H04N 23/695* (2023.01)

(52) U.S. Cl.
CPC .............. *G06T 7/70* (2017.01); *G06V 10/764* (2022.01); *H04N 23/69* (2023.01); *H04N 23/695* (2023.01)

(56) References Cited

U.S. PATENT DOCUMENTS

| | | | |
|---|---|---|---|
| 2010/0033571 A1* | 2/2010 | Fujita | G06V 20/584 348/149 |
| 2012/0143488 A1* | 6/2012 | Othmezouri | G06V 20/58 701/301 |
| 2014/0306833 A1* | 10/2014 | Ricci | G06V 40/28 340/901 |
| 2014/0309931 A1 | 10/2014 | Ohmori et al. | |
| 2014/0314270 A1* | 10/2014 | Nguyen | G06V 20/10 382/103 |
| 2015/0104064 A1* | 4/2015 | Guissin | G06T 7/246 382/103 |
| 2015/0378361 A1* | 12/2015 | Walker | G06T 7/75 114/343 |
| 2017/0161569 A1* | 6/2017 | Ren | G06V 20/62 |
| 2017/0174227 A1* | 6/2017 | Tatourian | G06V 20/58 |
| 2018/0239972 A1* | 8/2018 | Biemer | G06V 20/582 |
| 2020/0074197 A1* | 3/2020 | Upmanue | B60K 35/60 |
| 2021/0287393 A1* | 9/2021 | Warnaar | H04N 13/111 |

FOREIGN PATENT DOCUMENTS

| | | |
|---|---|---|
| JP | 2018096827 A | 6/2018 |
| WO | 2020045602 A1 | 3/2020 |

OTHER PUBLICATIONS

European Patent Office, Extended European Search Report Issued in Application No. 21910084.9, Sep. 20, 2024, Germany, 7 pages.

Pan, M. et al., "Visual Recognition Based on Deep Learning for Navigation Mark Classification," IEEE Access, vol. 8, Feb. 13, 2020, 9 pages.

Mentzelos, K., "Object Localization and Identification for Autonomous Operation of Surface Marine Vehicles," Master of Science Thesis, Massachusetts Institute of Technology Departments of Mechanical Engineering and Electrical Engineering and Computer Science, Jun. 2016, 100 pages.

* cited by examiner

| CLASSIFICATION | | BODY | TOP MARK | | ILLUSTRATION | | COL OF LIGHT |
|---|---|---|---|---|---|---|---|
| | DESCRIPTION | PAINT COLOR | PAINT COL | SHAPE | LIGHT BUOY | BUOY | |
| LATERAL SIGN | PORT SIGN | GREEN | GRN | 1 CYLINDER | | | GRN |
| | STARBOARD SIGN | RED | RED | 1 CONE | | | RED |
| DIRECTIONAL SIGN | NORTH SIGN | BLACK ABOVE YELLOW | BLACK | 2 CONES, ONE ABOVE OTHER, POINTS UP | | | WHITE |
| | EAST SIGN | 1 YELLOW BAND ON BLACK | BLACK | 2 CONES, ONE ABOVE OTHER, BASE TO BASE | | | WHITE |
| | SOUTH SIGN | YELLOW ABOVE BLACK | BLACK | 2 CONES, ONE ABOVE OTHER, POINTS DOWN | | | WHITE |
| | WEST SIGN | 1 BLACK BAND ON YELLOW | BLACK | 2 CONES, ONE ABOVE OTHER, POINT TO POINT | | | WHITE |
| ISOLATED OBSTRUCTION SIGN | | 1 OR MORE RED BAND ON BLACK | BLACK | 2 SPHERES, ONE ABOVE OTHER | | | WHITE |
| SAFE WATER AREA SIGN | | RED x WHITE STRIPE | RED | 1 SPHERE | | — | WHITE |
| SPECIAL SIGN | | YELLOW | YEL | 1 CROSS | | | YEL |

FIG. 2

BUOY MANAGEMENT DATABASE

| ID | CLASSIFI-CATION | DESCRIPTION OF SIGN | POSITION IN IMAGE | ACTUAL POSITION | VIRTUAL BUOY |
|---|---|---|---|---|---|
| 001 | LATERAL SIGN | PORT SIGN | x1, y1 | X1, Y1 | — |
| 002 | LATERAL SIGN | STARBOARD SIGN | x2, y2 | X2, Y2 | — |
| 003 | DIRECTIONAL SIGN | NORTH SIGN | x3, y3 | X3, Y3 | — |
| 004 | SAFE WATER AREA SIGN | — | x4, y4 | X4, Y4 | — |
| 005 | LATERAL SIGN | PORT SIGN | — | X5, Y5 | ○ |
| 005 | LATERAL SIGN | PORT SIGN | — | X6, Y6 | ○ |

BY-COUNTRY PORT-STARBOARD MODE TABLE

| COUNTRY | DESCRIPTION OF SIGN | COLOR | SHAPE |
|---|---|---|---|
| COUNTRY A | PORT SIGN | GREEN | CYLINDER |
| | STARBOARD SIGN | RED | CONE |
| COUNTRY B | PORT SIGN | RED | CONE |
| | STARBOARD SIGN | GREEN | CYLINDER |

| CLASSIFICATION | | COLOR | TOP MARK SHAPE | LIGHTING PATTERN | LIGHT COL |
|---|---|---|---|---|---|
| | DESCRIPTION | | | | |
| LATERAL SIGN | PORT SIGN | GREEN | 1 CYLINDER | SINGLE FLASHING (PERIOD:3-5 SEC)<br>GROUP FLASHING (2 PER 6 SEC)<br>MORSE CODE<br>CONTINUOUS SCINTILLATING | GRN |
| | STARBOARD SIGN | RED | 1 CONE | SINGLE FLASHING (PERIOD:3-5 SEC)<br>GROUP FLASHING (2 PER 6 SEC)<br>MORSE CODE<br>CONTINUOUS SCINTILLATING | RED |
| DIRECTIONAL SIGN | NORTH SIGN | BLACK ABOVE YELLOW | 2 CONES, ONE ABOVE OTHER, POINTS UP | CONTINUOUS SCINTILLATING | WHITE |
| | EAST SIGN | 1 YELLOW BAND ON BLACK | 2 CONES, ONE ABOVE OTHER, BASE TO BASE | GROUP FLASHING (3 QUICK FLASHES PER 10 SEC) | WHITE |
| | SOUTH SIGN | YELLOW ABOVE BLACK | 2 CONES, ONE ABOVE OTHER, POINTS DOWN | GROUP SCINTILLATING (6 QUICK AND 1 LONG FLASHES PER 15 SEC) | WHITE |
| | WEST SIGN | 1 BLACK BAND ON YELLOW | 2 CONES, ONE ABOVE OTHER, POINT TO POINT | GROUP SCINTILLATING (9 QUICK FLASHES PER 15 SEC) | WHITE |
| ISOLATED OBSTRUCTION SIGN | | 1 OR MORE RED BAND ON BLACK | 2 SPHERES, ONE ABOVE OTHER | GROUP FLASHING (2 PER 5 OR 10 SEC) | WHITE |
| SAFE WATER AREA SIGN | | RED x WHITE STRIPE | 1 SPHERE | ISOPHASE (2 SEC LIGHT, 2 SEC DARK)<br>MORSE CODE<br>LONG FLASHING (1 PER 10 SEC) | WHITE |
| SPECIAL SIGN | | YELLOW | 1 CROSS | SINGLE FLASHING (PERIOD:3-5 SEC)<br>GROUP FLASHING (5 PER 20 SEC)<br>MORSE CODE | YEL |

FIG. 19

AUTONOMOUS CRUISING SYSTEM, NAVIGATIONAL SIGN IDENTIFYING METHOD, AND NON-TRANSITORY COMPUTER-READABLE MEDIUM

CROSS-REFERENCE TO RELATED APPLICATION(S)

This application is a continuation-in-part application of PCT International Application No. PCT/JP2021/042612, which was filed on Nov. 19, 2021, and which claims priority to Japanese Patent Application No. JP2020-215313 filed on Dec. 24, 2020, the entire disclosures of each of which are herein incorporated by reference for all purposes.

TECHNICAL FIELD

The present disclosure relates to a navigational sign identifying device, an autonomous cruising system, a navigational sign identifying method, and a program.

BACKGROUND ART

Patent Document 1 discloses an automatic visual recognition device which automatically identifies navigational signs.

REFERENCE DOCUMENT OF CONVENTIONAL ART

Patent Document

Patent Document 1 JP-H04-076562B

DESCRIPTION OF THE DISCLOSURE

Problem(s) to be Solved by the Disclosure

Meanwhile, since buoys which float on the sea surface are smaller than ships, it is difficult to identify description of the sign of a buoy which is apart from a ship.

The present disclosure is made in view of the above-described problem, and a main purpose thereof is to provide a navigational sign identifying device, an autonomous cruising system, a navigational sign identifying method, and a program, which are capable of improving the accuracy of identifying description of a sign.

SUMMARY OF THE DISCLOSURE

In order to solve the above-described problem, a navigational sign identifying device according to one aspect of the present disclosure includes a first acquirer, a first identifier, a second acquirer, and a second identifier. The first acquirer acquires a first image including a buoy from a camera installed in a ship. The first identifier identifies a position of the buoy inside the first image. The second acquirer acquires a second image corresponding to a partial area of the first image including the position of the buoy. The second image is higher in resolution than the first image. The second identifier identifies description of a sign of the buoy based on the second image.

In the above-described aspect, the camera may have an optical zoom function. The second acquirer may cause the camera to magnify and image a range corresponding to the partial area of the first image to acquire the second image.

In the above-described aspect, the camera may have a pan/tilt function. The second acquirer may direct an imaging direction of the camera toward the range corresponding to the partial area of the first image based on the position of the buoy.

In the above-described aspect, the second acquirer may acquire the second image by increasing the resolution of the partial area of the first image.

In the above-described aspect, the second acquirer may acquire the second image by causing an auxiliary camera to image the range corresponding to the partial area of the first image. The auxiliary camera is higher in resolution than the camera.

In the above-described aspect, the first identifier may identify the position of the buoy inside the first image by using a first learned model. The second identifier may identify the description of the sign of the buoy based on the second image by using a second learned model.

In the above-described aspect, the first learned model and the second learned model may be formed by incorporating a first learned parameter and a second learned parameter into a common inference program, respectively. The first learned parameter and the second learned parameter are different from each other.

In the above-described aspect, the first identifier may further identify a classification of the buoy.

In the above-described aspect, when the classification of the buoy is a lateral sign, the second identifier may identify whether the description of the sign of the buoy is either one of a port sign and a starboard sign.

In the above-described aspect, when the classification of the buoy is a directional sign, the second identifier may identify whether the description of the sign of the buoy is either one of a North sign, an East sign, a South sign, and a West sign.

In the above-described aspect, when the classification of the buoy is a lateral sign, the second identifier may identify whether the description of the sign of the buoy is either one of the port sign and the starboard sign, by using a learned model for lateral signs, and when the classification of the buoy is a directional sign, the second identifier may identify whether the description of the sign of the buoy is either one of a North sign, an East sign, a South sign, and a West sign, by using a learned model for directional signs.

In the above-described aspect, the second acquirer may not acquire the second image, when the classification of the buoy is any one of an isolated obstruction sign, a safe water area sign, and a special sign.

In the above-described aspect, when a plurality of buoys are identified from the first image, the second acquirer and the second identifier may perform the acquisition of the second image and the identification of the description of the sign for each of the plurality of buoys, respectively.

In the above-described aspect, the navigational sign identifying device may further include a display controller which displays a symbol indicative of the description of the sign of the buoy in any one of the first image, an electronic nautical chart, and a radar image based on the description of the sign of the buoy, the position of the buoy inside the first image, and an imaging direction of the camera.

In the above-described aspect, the navigational sign identifying device may further include a consistency determinator which determines consistency of the description of the sign of the buoy with description of the sign indicated by navigational sign data recorded on an electronic nautical chart, based on the description of the sign of the buoy, the position of the buoy inside the first image, an imaging direction of the camera, and a position of the ship.

In the above-described aspect, the navigational sign identifying device may further include a display controller which displays a determination result of the consistency in any one of the first image, the electronic nautical chart, and a radar image.

Further, an autonomous cruising system according to another aspect of the present disclosure may include the navigational sign identifying device described above and a route calculator. The route calculator calculates one of a route of the ship and a width of the route based on the position of the buoy inside the first image and an imaging direction of the camera, when the description of signs of a plurality of buoys includes at least two of a port sign, a starboard sign, and a safe water area sign.

Further, an autonomous cruising system according to another aspect of the present disclosure may include the navigational sign identifying device described above, a virtual sign acquirer, and a route calculator. The virtual sign acquirer acquires data indicative of a position of a virtual sign and description of the virtual sign. The route calculator calculates one of a route of the ship and a width of the route based on the description of the sign of the buoy, the position of the virtual sign, and the description of the virtual sign.

Further, an autonomous cruising system according to another aspect of the present disclosure may include the navigational sign identifying device described above, a position detector, and a route calculator. The position detector detects a position of the ship. The route calculator sets a course-changing point through which the ship is to pass, based on the description of the sign of the buoy, the position of the buoy inside the first image, an imaging direction of the camera, and the position of the ship.

Further, an autonomous cruising system according to another aspect of the present disclosure may include the navigational sign identifying device described above, a direction detector, and a route calculator. The direction detector detects a heading of the ship. The route calculator sets a direction in which the ship is to travel, based on the description of the sign of the buoy, an imaging direction of the camera, and the heading of the ship.

In the above-described aspect, the autonomous cruising system may further include an autopilot which performs an autonomous navigation control based on the description of the sign of the buoy.

Further, a method of identifying a navigational sign according to another aspect of the present disclosure includes acquiring a first image including a buoy from a camera installed in a ship, identifying a position of the buoy inside the first image, acquiring a second image corresponding to a partial area of the first image including the position of the buoy, the second image being higher in resolution than the first image, and identifying description of a sign of the buoy based on the second image.

Further, a program according to another aspect of the present disclosure causes a computer to perform processing which includes acquiring a first image including a buoy from a camera installed in a ship, identifying a position of the buoy inside the first image, acquiring a second image corresponding to a partial area of the first image including the position of the buoy, the second image being higher in resolution than the first image, and identifying description of a sign of the buoy based on the second image.

Effect of the Disclosure

According to the present disclosure, it becomes possible to improve the accuracy of identifying the description of the sign.

BRIEF DESCRIPTION OF DRAWINGS

FIG. 2 is a view illustrating description of signs of a buoy.
FIG. 19 is a view illustrating lighting patterns etc. of the buoy.

MODES FOR CARRYING OUT THE DISCLOSURE

Hereinafter, one embodiment of the present disclosure is described with reference to the drawings.

Figure 1:
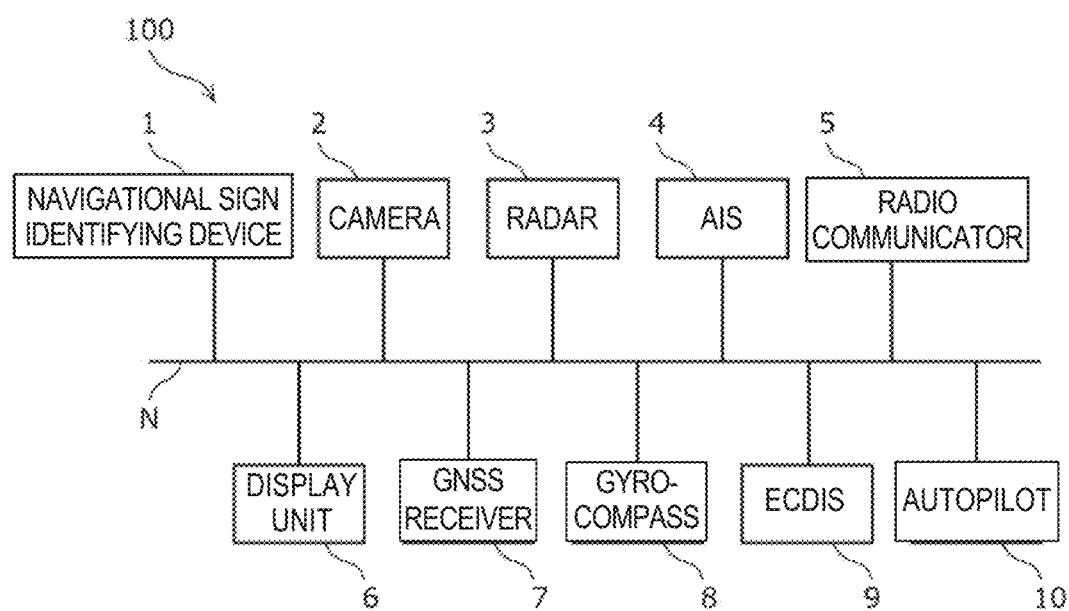
FIG. 1 is a block diagram illustrating one example of a configuration of an autonomous cruising system.

FIG. 1 is a block diagram illustrating one example of a configuration of an autonomous cruising system 100. The autonomous cruising system 100 may be an ICT system mounted on a ship. Below, a ship on which the autonomous cruising system 100 is mounted is referred to as "the ship."

The autonomous cruising system 100 may include a navigational sign identifying device 1, a camera 2, a radar 3, an MS 4, a radio communicator 5, a display unit 6, a GNSS receiver 7, a gyrocompass 8, an ECDIS 9, and an autopilot 10. These apparatuses may be connected to a network N, such as a LAN, so that mutual network communications are possible.

The navigational sign identifying device 1 may be a computer including a CPU, a RAM, a ROM, a nonvolatile memory, and an input/output interface. The CPU of the navigational sign identifying device 1 may perform information processing according to a program loaded to the RAM from the ROM or the nonvolatile memory.

The program may be supplied, for example, via an information storage medium, such as an optical disc or a memory card, or may be supplied, for example, via a communication network, such as the Internet or LAN.

The camera 2 may be a digital camera which images outside of the ship to generate image data. The camera 2 may be installed, for example, in a bridge of the ship so as to be oriented to the bow direction of the ship (heading). The camera 2 may be a visible light camera which can image at least a visible range. It may be capable of imaging not only the visible range but also an infrared range.

In this embodiment, the camera 2 may be a camera having a pan/tilt function and an optical zoom function (so-called "PTZ camera"). The camera 2 may perform pan, tilt, or zoom operation according to a command from the navigational sign identifying device 1.

The radar 3 may transmit a radio wave around the ship, receive a reflection wave thereof, and generate echo data based on the reception signal. Further, the radar 3 may discriminate or identify a target object from the echo data, and generate Target-object Tracking data (TT data) indicative of a position and a speed of the target object.

The AIS (Automatic Identification System) 4 may receive AIS data from other ships or land controls which exist around the ship. Without being limited to the AIS, a VDES (VHF Data Exchange System) may also be used. The AIS data may include a position and a speed of another ship.

The AIS 4 may acquire AIS data indicative of a position and description of a sign of a virtual sign. The AIS 4 is one example of a virtual sign acquirer. The virtual sign using the AIS is a so-called "virtual AIS navigational sign."

The radio communicator 5 may include various radio apparatuses for realizing communications with other ships or land controls, such as radio apparatuses of an ultrashort wave band, an intermediate wave band, and a shortwave band.

The display unit 6 may be a display device, for example, with a touch sensor (so-called "touch panel"). The display unit may be a liquid crystal display or an organic electroluminescence display. Without being limited to the touch sensor, other pointing devices, such as a trackball or a mouse may also be used.

On the display unit 6, an image captured by the camera 2, a radar image generated by the radar 3, an electronic nautical chart, or a synthetic image in which the radar image is synthesized with the electronic nautical chart may be displayed.

The GNSS receiver 7 may detect the position of the ship (ship position based on the radio wave received from a GNSS (Global Navigation Satellite System). The GNSS receiver 7 is one example of a position detector which detects the ship position.

The gyrocompass 8 may detect the heading (bow direction) of the ship. The gyrocompass 8 is one example of a direction detector which detects the heading of the ship. Without being limited to the gyrocompass, other types of direction meters, such as a GPS compass, may also be used.

The ECDIS (Electronic Chart The display and Information System) 9 may acquire the ship position from the GNSS receiver 7, and display the ship position on the electronic nautical chart. Further, the ECDIS 9 may also display a scheduled route of the ship on the electronic nautical chart. Without being limited to the ECDIS, a GNSS plotter may also be used.

The autopilot 10 may calculate a target rudder angle for turning the bow toward a target course based on the target course acquired from the navigational sign identifying device 1 etc. and the heading acquired from the gyrocompass 8, and drive a steering mechanism so as to bring a rudder angle of the steering mechanism closer to the target rudder angle. Further, the autopilot 10 may also control an engine.

Although in this embodiment the navigational sign identifying device 1 is an independent device, it may be integrated with another device, such as the ECDIS 9. That is, the function of the navigational sign identifying device 1 may be realized by another device, such as the ECDIS 9.

Further, although in this embodiment the display unit 2 is also an independent device, without being limited to this configuration, a display unit provided to another device, such as the ECDIS 9, may also be used as the display unit 2 which displays the image generated by the navigational sign identifying device 1.

FIG. 2 is a view illustrating the description of the signs of a buoy. The buoy may be a navigational sign which floats on the sea surface. The classification and the description of the sign of the buoy may be classified according to the color of the buoy, the shape of a top mark, etc.

The classification of the buoy may include a lateral sign, a directional sign, an isolated obstruction sign, a safe water area sign, and a special sign. The description of the sign of the lateral sign may include a port sign and a starboard sign. The port and starboard may indicate left and right when going to a water source. The description of the sign of the directional sign may include a North sign, an East sign, a South sign, and a West sign.

As for the isolated obstruction sign, the safe water area sign, and the special sign, the description of these signs may not be subdivided any more, that is, it can be said that the classification of the buoy itself indicates the description of the sign.

Meanwhile, since the buoy which floats on the sea surface is smaller than a ship, it is difficult to identify the description of the sign of the buoy which is apart from the ship. Thus, in this embodiment, the accuracy of identifying the description of the sign is improved by acquiring an image stepwise as will be described below.

Figure 3:
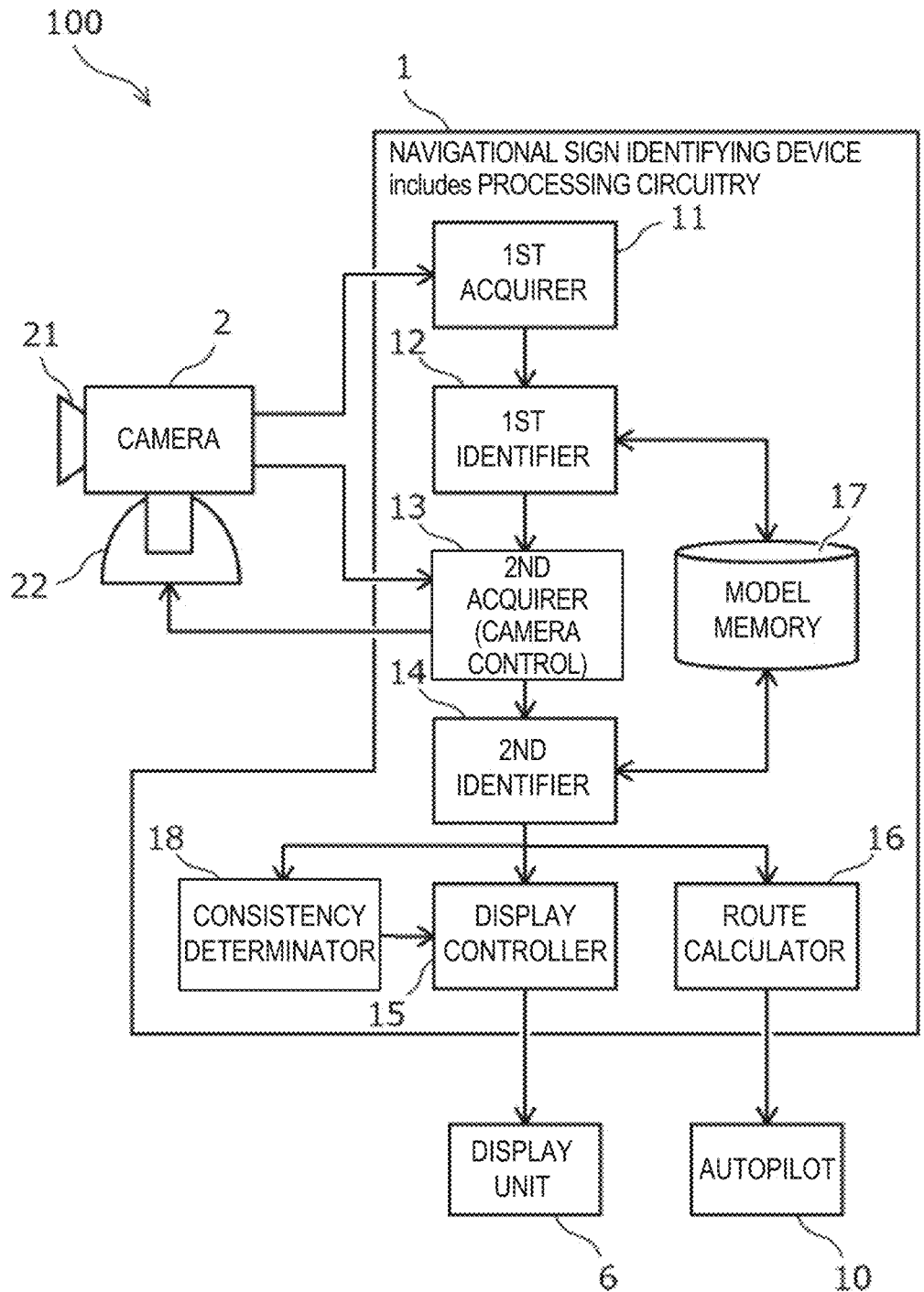
FIG. 3 is a block diagram illustrating one example of a functional configuration of a navigational sign identifying device.

FIG. 3 is a block diagram illustrating one example of a functional configuration of the navigational sign identifying device 1 according to one embodiment. The navigational sign identifying device 1 may include a first acquirer 11, a first identifier 12, a second acquirer 13, a second identifier 14, a display controller 15, a route calculator 16, and a consistency determinator 18.

These function parts may be realized by the CPU of the navigational sign identifying device 1 performing information processing according to a program. Note that some function parts of the display controller 15 or the route calculator 16 may be realized by a computer which is different from the navigational sign identifying device 1 and included in the ECDIS 9 or the autopilot 10.

Further, the navigational sign identifying device 1 may be provided with a model memory 17 which stores a learned model. This memory may be provided to the nonvolatile memory of the navigational sign identifying device 1. Without being limited to this configuration, the model memory 17 may be provided outside the navigational sign identifying device 1.

The first acquirer 11 may acquire a first image generated by the camera 2. In detail, the first acquirer 11 may sequentially acquire a plurality of time-series first images generated by the camera 2, and may sequentially provide them to the first identifier 12.

The first image may be an image captured when the camera 2 is in a normal state. The normal state may be a state in which, for example, the magnification of optical zoom is the minimum, and the imaging direction is in the heading direction. The camera 2 may repeat the generation of the first image in the normal state, except for a period when it is controlled by the second acquirer 13.

For example, the plurality of time-series first images may be a plurality of still images (frames) included in a video, or may be a plurality of still images individually generated by imaging at a given interval.

Figure 4:
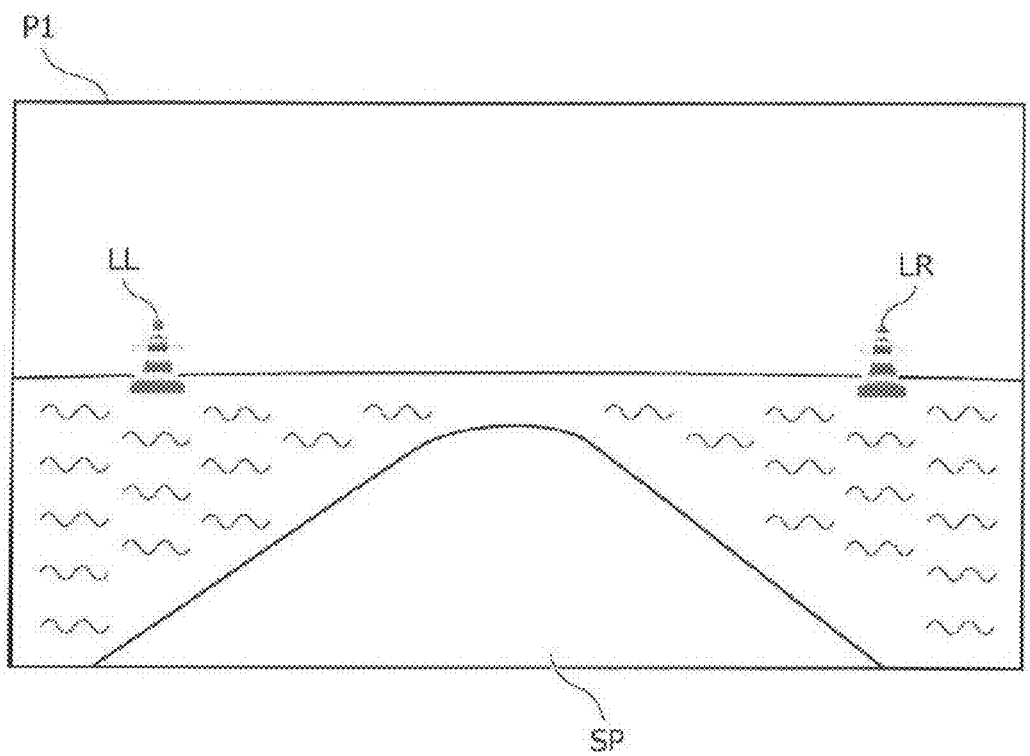
FIG. 4 is a view illustrating one example of a first image.

FIG. 4 is a view illustrating one example of a first image P1 acquired by the first acquirer 11. This drawing illustrates one example in which the first image P1 includes a port sign LL and a starboard sign LR which float on the sea surface ahead of the ship, in addition to a ship body (hull) SP of the ship.

The first identifier 12 may identify a position of the buoy inside the first image P1. In detail, the first identifier 12 may identify the position of the buoy inside the first image P1 by using a first learned model stored in the model memory 17. The first identifier 12 may further identify the classification of this buoy, along with the position of the buoy inside the first image P1.

The first learned model may be generated by machine learning which uses an image for learning (learning image) as input data, and uses a label of the buoy inside the learning image (or a label of the classification of the buoy) and a position of the buoy as teacher data. The first learned model generated in this way may estimate the label of the buoy inside the first image P1 (or the label of the classification of the buoy), the position of the buoy, and probability of the buoy. The position of the buoy may be expressed, for example, by coordinates of a boundary box which surrounds the buoy.

As the first learned model, an object detection model, such as an SSD (Single Shot MultiBox Detector), a YOLO (You Only Look Once), or a Mask R-CNN may be used. Without being limited to this configuration, an area division model, such as a Semantic Segmentation or an Instance Segmentation, or a characteristic point detection model, such as a Keypoint Detection may be used as the first learned model.

Figure 5:
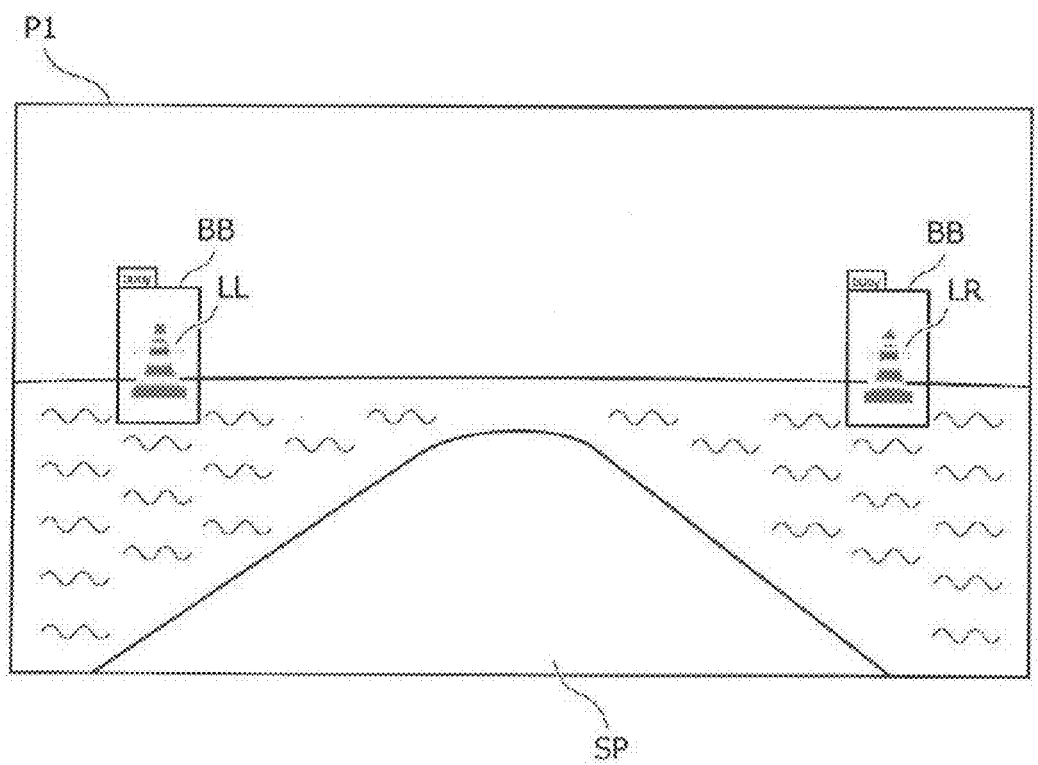
FIG. 5 is a view illustrating one example of identification by a first identifier.

FIG. 5 is a view illustrating one example of identification of the first image P1 by the first identifier 12. This drawing illustrates one example in which each of the port sign LL and the starboard sign LR is identified as a buoy (or a lateral buoy), and is surrounded by a boundary box BB.

The second acquirer 13 may acquire a second image which corresponds to a partial area of the first image P1 including the position of the buoy and which is higher in resolution than the first image P1. The partial area may be the boundary box BB (see FIG. 5) identified by the first identifier 12, for example.

The camera 2 may include a lens part 21 which realizes the optical zoom function, and a pan/tilt mechanism 22 which realizes the pan/tilt function, and the second acquirer 13 may acquire the second image by controlling the lens part 21 and the pan/tilt mechanism 22 of the camera 2.

In detail, the second acquirer 13 may acquire the second image by controlling the lens part 21 so that the camera 2 magnifies a range of the real space corresponding to the partial area of the first image P1 and images the range. Thus, by utilizing the optical zoom function, the second image which is higher in resolution than the first image P1 may be acquired.

Further, the second acquirer 13 may control the pan/tilt mechanism 22 so that the imaging direction of the camera 2 is turned to an area of the real space corresponding to the partial area of the first image P1. The second acquirer 13 may set a target value of the imaging direction of the camera 2 according to the position of the buoy inside the first image P1 identified by the first identifier 12.

Figure 6:
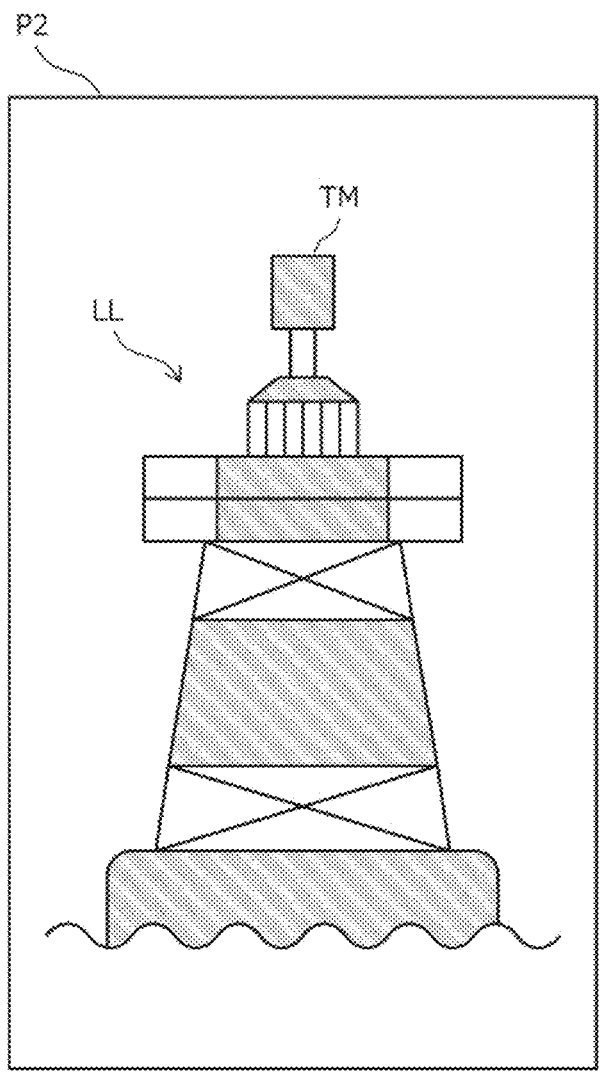
FIG. 6 is a view illustrating one example of a second image.

FIG. 6 is a view illustrating one example of the second image P2 acquired by the second acquirer 13. This drawing illustrates one example in which the port sign LL is included in the second image P2. In the second image P2, it may be easier to identify the color of the port sign LL and the shape of a top mark TM than in the first image P1 (see FIG. 4).

Note that, as illustrated in FIG. 5, when a plurality of buoys (in the illustrated example, the port sign LL and the starboard sign LR) are identified inside the first image P1, the second acquirer 13 may cause the camera 2 to sequentially image each of the plurality of buoys to acquire the second image P2 for each of the plurality of buoys.

The second identifier 14 may identify the description of the sign of the buoy based on the second image P2. In detail, the second identifier 14 may identify the description of the sign of the buoy based on the second image P2 by using a second learned model stored in the model memory 17.

The second learned model may be generated by machine learning in which the learning image is used as input data, and the label of the description of the sign of the buoy inside the learning image is used as teacher data. The second learned model thus generated may estimate the label of the description of the sign of the buoy inside the second image P2, and the probability thereof.

As the second learned model, for example, a model similar to the above-described first learned model may be used. In this case, the first learned model and the second learned model may be models in which a first learned parameter and a second learned parameter, which are different from each other, are incorporated into a common inference program.

Without being limited to this configuration, the second learned model may be an object identification model which identifies an object but does not detect the position of the object.

Further, the second learned model may include a learned model for lateral signs which is specialized in identification of the description of the sign of the lateral sign, and a learned model for directional signs which is specialized in identification of the description of the sign of the directional sign.

Figure 7:
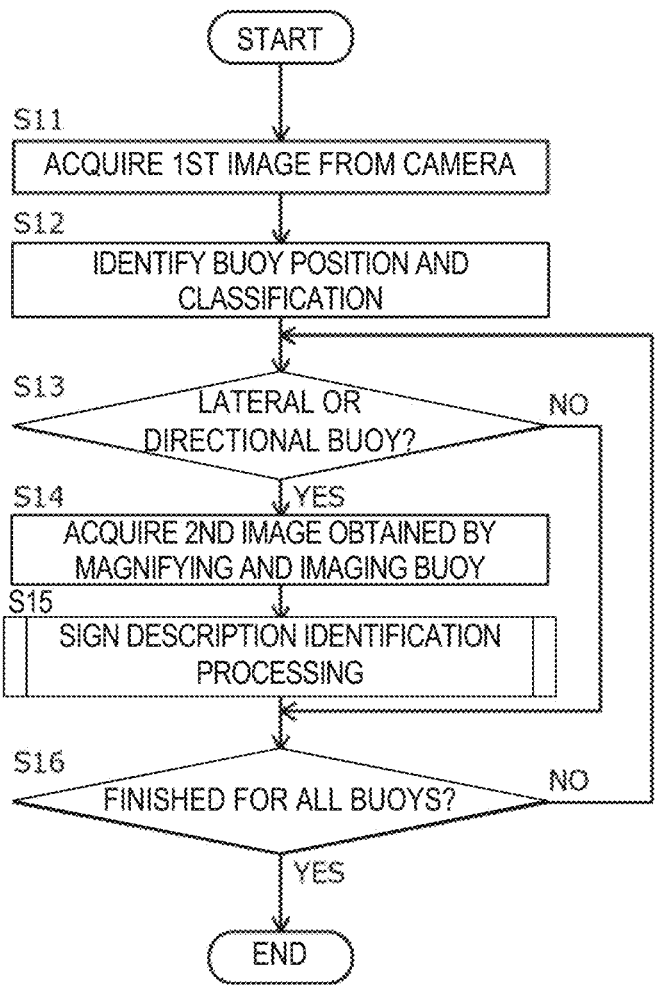
FIG. 7 is a flowchart illustrating an example procedure of a navigational sign identifying method.
Figures 8, 9:
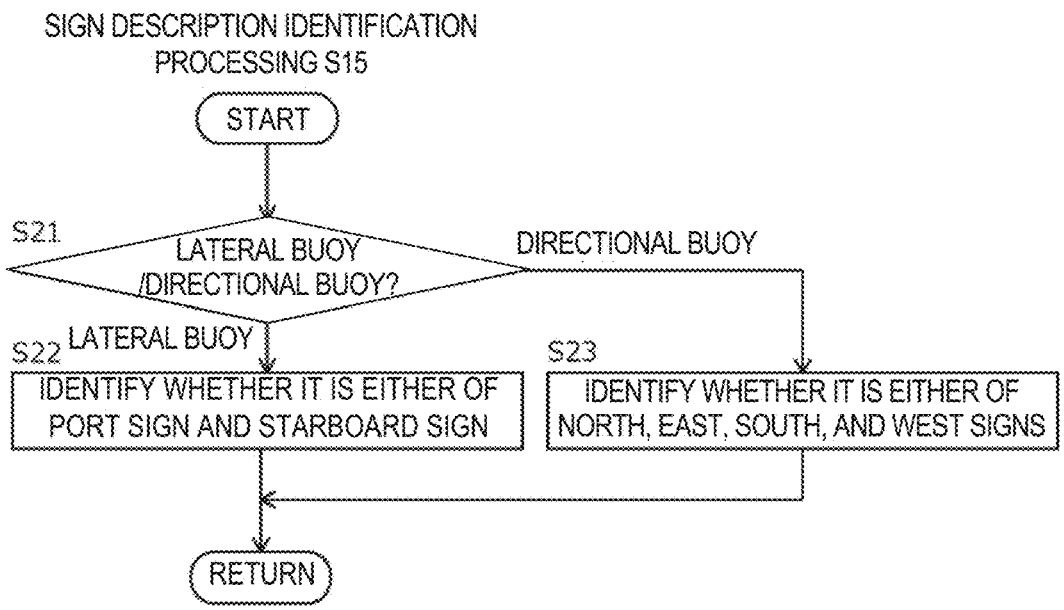
FIG. 8 is a flowchart illustrating an example procedure of a sign description identification processing.
FIG. 9 is a view illustrating one example of a buoy management database.

FIGS. 7 and 8 are flowcharts illustrating an example procedure of a navigational sign identifying method realized by the navigational sign identifying device 1. These drawings mainly illustrate processing related to the acquisition of the image and the identification of the description of the sign among the processings performed by the navigational sign identifying device 1.

The CPU of the navigational sign identifying device 1 may function as the first acquirer 11, the first identifier 12, the second acquirer 13, and the second identifier 14 by performing information processing illustrated in these drawings according to the program.

As illustrated in FIG. 7, first, the navigational sign identifying device 1 may acquire the first image P1 (see FIG. 4) from the camera 2 (S11: processing as the first acquirer 11).

Next, the navigational sign identifying device 1 may identify the position and the classification of the buoy inside the first image P1 by using the first learned model (S12: processing as the first identifier 12).

Next, the navigational sign identifying device 1 may determine whether the classification of the buoy identified in the first image P1 is a lateral buoy or a direction buoy (S13).

If the classification of the buoy is a lateral buoy or a direction buoy (S13→YES), the navigational sign identifying device 1 may control the camera 2 to acquire the second image P2 (see FIG. 6) which is obtained by magnifying and imaging the buoy (S14: processing as the second acquirer 13).

Next, the navigational sign identifying device 1 may perform a sign description identification processing for identifying the description of the sign of the buoy based on the second image P2 (S15: processing as the second identifier 14).

As illustrated in FIG. 8, at the sign description identification processing S15, if the classification of the buoy is a lateral buoy (S21→lateral buoy), the navigational sign identifying device 1 may identify whether the description of the sign is either one of the port sign and the starboard sign, by using the learned model for lateral signs as the second learned model (S22).

On the other hand, if the classification of the buoy is a direction buoy (S21→ direction buoy), the navigational sign identifying device 1 may identify whether the description of the sign is either one of the North sign, the East sign, the South sign, and the West sign, by using the learned model for directional signs as the second learned model (S23).

Note that, if the classification of the buoy is not a lateral buoy or a direction buoy (S13→NO) (i.e., if the classification of the buoy is the isolated obstruction sign, the safe water area sign, or the special sign), the navigational sign identifying device 1 may not acquire the second image P2. It is because the classification itself indicates the description of the sign for these buoys.

If a plurality of buoys are identified inside the first image P1 at S12, the navigational sign identifying device 1 may perform S13-S15 for all the identified buoys (S16). That is, it may perform the acquisition of the second image P2 and the identification of the description of the sign for all the buoys which are the lateral buoys or the direction buoys.

According to the above embodiment, since the description of the sign is identified from the second image P2 which is magnified and imaged based on the position of the buoy identified in the first image P1 and which is higher in resolution than the first image P1, it becomes possible to improve the accuracy of identifying the description of the sign.

Further, according to this embodiment, since the description of the sign is identified from the second image P2 after the classification of the buoy is identified in the first image P1, it can narrow down the description of the sign according to the classification of the buoy, and it becomes possible to further improve the accuracy of identifying the description of the sign.

Without being limited to this configuration, the buoy and its position may be identified from the first image P1, and the classification of the buoy and the description of the sign may be identified from the second image P2.

FIG. 9 is a view illustrating one example of a buoy management DB (database). The buoy management DB may be a database for managing the information on the buoy which is identified or acquired, and may be provided to the nonvolatile memory of the navigational sign identifying device 1. The buoy management DB may include not only the information on the buoy identified from the image of the camera 2 but also the information on the virtual sign acquired by the AIS 4.

The buoy management DB may include fields, such as "identifier," "classification," "description of sign," "position in image," "actual position," and "virtual buoy." The "identifier" may be an identifier for identifying the buoy. The "virtual buoy" may indicate whether it is a virtual buoy.

The "classification" may indicate the classification of the buoy. The "description of sign" may indicate the description of the sign of the buoy. If the "classification" is a lateral sign or a directional sign, the port sign etc. or the North sign etc. may be inputted into the "description of sign." On the other hand, if the "classification" is the isolated obstruction sign, the safe water area sign, or the special sign, data may not be inputted into the "description of sign."

The "position in image" may indicate the position of the buoy inside the first image P1 (see FIG. 4). Note that, in the case of the virtual buoy, data may not be inputted into the "position in image." The "actual position" may indicate the actual position of the buoy. The actual position of the buoy identified from the image of the camera 2 may be calculated based on the position of the buoy inside the image and the imaging direction of the camera 2.

Returning to description of FIG. 3, the display controller 15 may generate display data related to the buoy, and output it to the display unit 6. In detail, the display controller 15 may display a symbol indicative of the description of the sign of the buoy in the first image P1, the electronic nautical chart, or the radar image based on the description of the sign of the identified buoy, the position of the buoy inside the first image P1, and the imaging direction of the camera 2.

Figure 10:
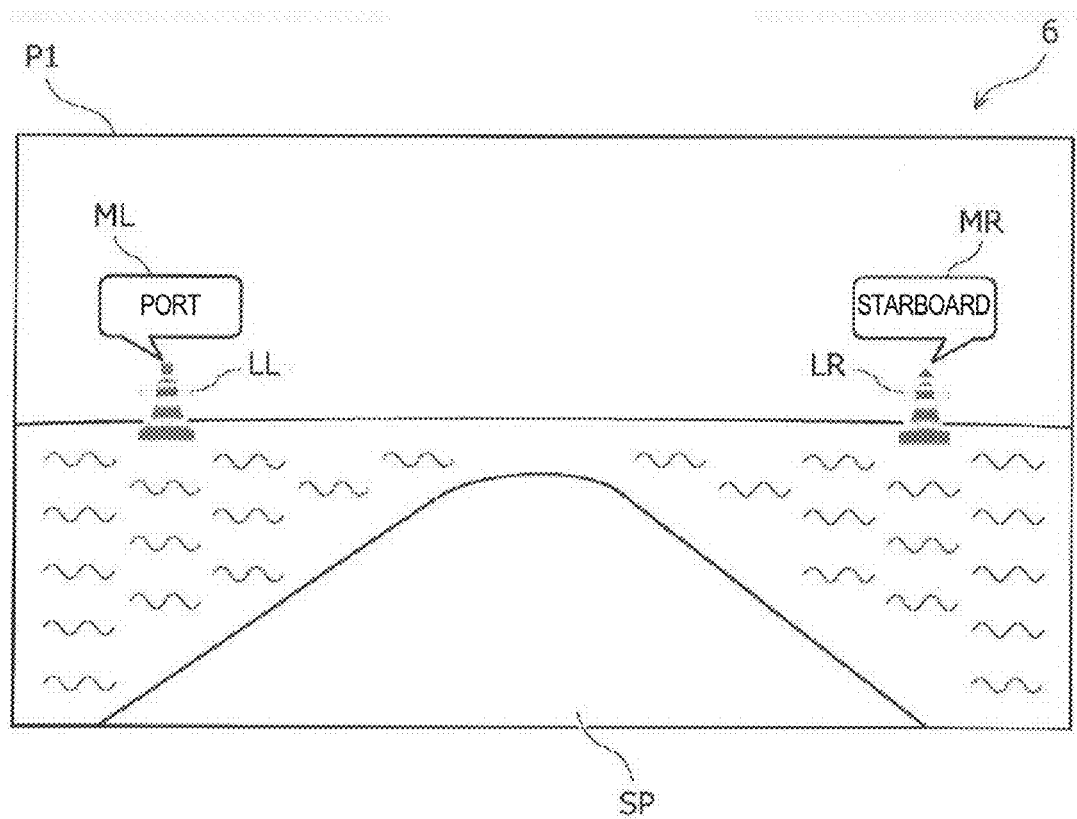
FIG. 10 is a view illustrating one example of indication by a display unit.

For example, as illustrated in FIG. 10, the display controller 15 may display on the display unit 6 an image with symbols ML and MR indicative of the description of the port sign LL and the starboard sign LR inside the first image P1, which are associated with the positions of the port sign LL and the starboard sign LR. Each of the symbols ML and MR may include a character string indicative of the description of the sign, for example.

Figure 11:
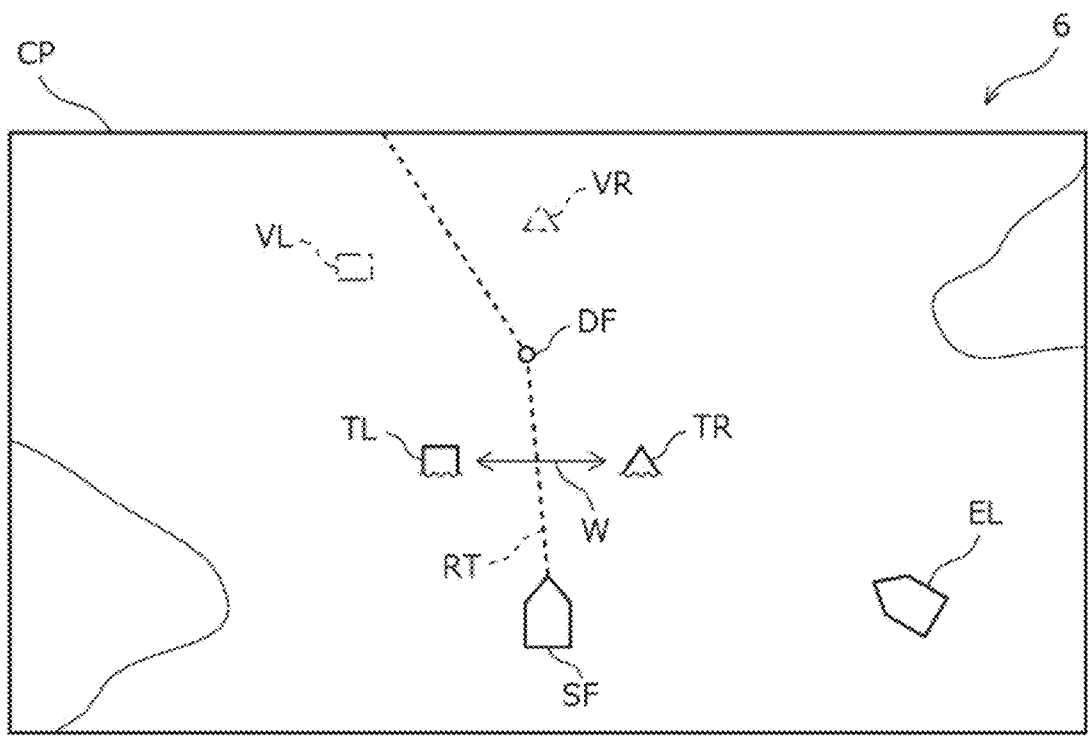
FIG. 11 is a view illustrating another example of indication by the display unit.

Further, as illustrated in FIG. 11, the display controller 15 may display on the display unit 6 an image with symbols TL and TR indicative of the description of the port sign LL and the starboard sign LR inside a synthesized image CP in which the electronic nautical chart is synthesized with the radar image, which are associated with the positions corresponding to the actual positions of the port sign LL and the starboard sign LR. Each of the symbols TL and TR may have a shape indicative of the description of the sign, for example.

In the synthesized image CP, a symbol SF of the ship, a scheduled route RT of the ship, a course-changing point DF on the scheduled route RT, a symbol EL of another ship, etc. may be displayed.

Further, symbols VL and VR indicative of the description of the virtual signs may be displayed in the synthesized image CP. The symbols VL and VR may have similar shapes to the symbols TL and TR. Preferably, the symbols VL and VR may be displayed so that they are discriminable from the symbols TL and TR, for example, by changing their transparencies.

The route calculator 16 may calculate a target course (i.e., the bearing, the course-changing point, and the route) for performing the autonomous navigation control based on the description of the sign of the identified buoy. The calculated target course may be provided to the autopilot 10 which performs the autonomous navigation control. Here, an incorrect recognition of the identified description of the navigational sign may become a cause of a serious accident when performing the autonomous navigation control. Therefore, the autonomous cruising system which fits for the real environment navigation can be realized by performing the autonomous navigation control with the identification of the description of the navigational sign which is improved in the accuracy by the present disclosure.

As illustrated in FIG. 5, when the buoy identified inside the first image P1 includes the port sign LL and the starboard sign LR, the route calculator 16 may calculate a scheduled route or route width of the ship based on the positions of the port sign LL and the starboard sign LR inside the first image P1, and the imaging direction of the camera 2. In detail, the route calculator 16 may set the scheduled route RT of the ship based on the actual positions of the port sign LL and the starboard sign LR which are calculated from the positions of the port sign LL and the starboard sign LR inside the first image P1, and the imaging direction of the camera 2 so that the scheduled route RT passes through between the port sign LL and the starboard sign LR from the ship position (see FIG. 11). Without being limited to this configuration, when the buoy identified inside the first image P1 includes the port sign LL or the starboard sign LR, and the safe water area sign, the route calculator 16 may set the scheduled route RT of the ship between the port sign LL or the starboard sign LR, and the safe water area sign.

Further, the route calculator 16 may calculate a distance between the port sign LL and the starboard sign LR as a route width W based on the actual positions of the port sign LL and the starboard sign LR which are calculated from the positions of the port sign LL and the starboard sign LR inside the first image P1, and the imaging direction of the camera 2. The calculated route width W may be displayed in the first image P1 displayed on the display unit 6, or may be displayed in the synthesized image CP in which the electronic nautical chart is synthesized with the radar image (see FIG. 11).

The route calculator 16 may set the course-changing point through which the ship goes, based on the description of the sign of the identified buoy, the position of the buoy inside the first image P1, the imaging direction of the camera 2, and the ship position. In detail, the route calculator 16 may set one or more course-changing point DF for setting the scheduled route RT of the ship which arrives at a port or leaves the port based on the description of the lateral sign and the sign of the direction buoy which are identified, the actual positions of these buoys which are calculated from the positions of these buoys in the first image P1 and the imaging direction of the camera 2, and the ship position (see FIG. 11). Without being limited to this configuration, the route calculator 16 may set one or more course-changing points for setting an evading route which avoids an obstacle or a special area based on the description of the identified isolated obstruction sign or special sign, the actual positions of these buoys calculated from the positions of these buoys in the first image P1, the imaging direction of the camera 2, and the ship position.

The route calculator 16 may set the direction in which the ship is to travel based on the description of the sign of the identified buoy, the imaging direction of the camera 2, and the heading of the ship. For example, the route calculator 16 may maintain or adjust the direction in which the ship is to travel so that the buoy, such as the lateral buoy, continues being included in the plurality of time-series first images P1. Further, the route calculator 16 may set the direction in which the ship is to travel by further using the position of the buoy inside the first image P1 so that the ship goes between the port sign and the starboard sign, or goes in the direction along the plurality of port signs or starboard signs.

The route calculator 16 may calculate the target course for performing the autonomous navigation control (i.e., the direction, the course-changing point, and the route) based on, in addition to the description of the sign of the identified buoy, the position and the description of the virtual sign. In detail, when the data of the virtual port sign VL and the virtual starboard sign VR are acquired, the route calculator 16 may set the scheduled route RT of the ship so that the ship passes through not only between the port sign LL and the starboard sign LR which are identified inside the first image P1 but also between the virtual port sign VL and the virtual starboard sign VR.

The consistency determinator 18 may determine the consistency (matching) of the description of the sign of the buoy with the description of the sign which is indicated by the navigational sign data recorded on the electronic nautical chart based on the description of the sign of the identified buoy, the position of the buoy inside the first image P1, the imaging direction of the camera 2, and the ship position. In detail, the consistency determinator 18 may calculate the actual position of the buoy based on the position of the buoy inside the first image P1, the imaging direction of the camera 2, and the ship position, and extract the navigational sign data corresponding to the actual position of the buoy from the navigational sign data recorded on the electronic nautical chart, and determine whether the description of the sign of the identified buoy matches with the description of the sign of the extracted navigational sign data.

The display controller 15 may display the determination result by the consistency determinator 18 in the first image P1, the electronic nautical chart, or the radar image. For example, the display controller 15 may display it so that a symbol indicative of "match" or "not match" is associated with the buoy in the first image P1 (see FIG. 10) or the synthesized image CP (see FIG. 11) which are displayed on the display unit 6. Alternatively, the display controller 15 may display the symbol indicative of the description of the sign (the symbols ML and MR of FIG. 10, or the symbols TL and TR of FIG. 11), for the buoy which is matched.

Figure 12:
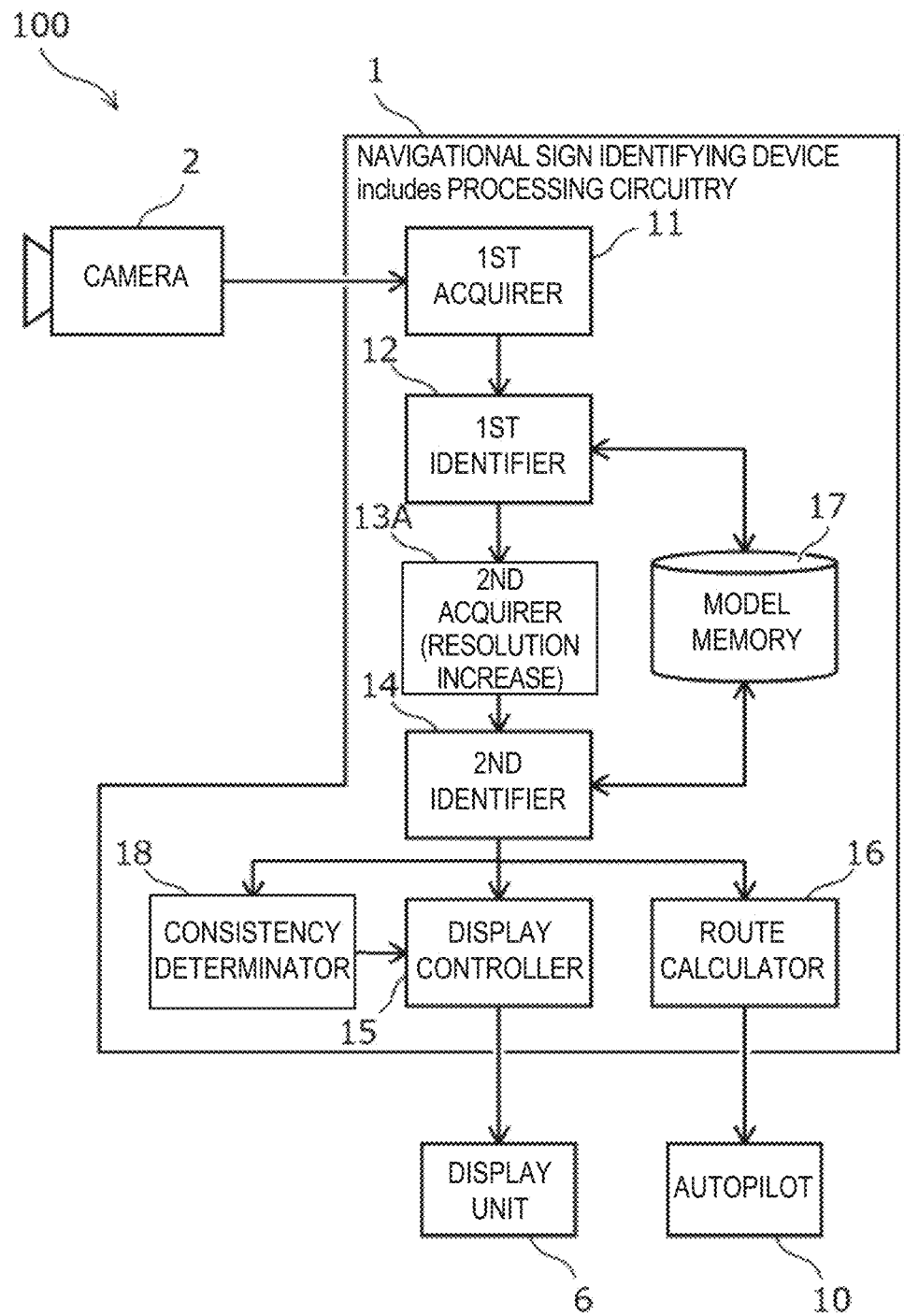
FIG. 12 is a block diagram illustrating another example of the configuration of the navigational sign identifying device.

The configuration of the navigational sign identifying device 1 is not limited to the example illustrated in FIG. 3. For example, as illustrated in FIG. 12, the second acquirer 13A may be an image processor which acquires the second image by increasing the resolution of the partial area of the first image. Thus, by increasing the resolution, the second image which is higher in the resolution than the first image may be acquired.

Without being limited to this configuration, the first acquirer 11 may acquire the first image by thinning or averaging the original images generated by the camera 2, and the second acquirer 13 may acquire the second image by cutting out an area corresponding to the partial area of the first image from the original image. The second image which is higher in resolution than the first image may be acquired also by this configuration.

Figure 13:
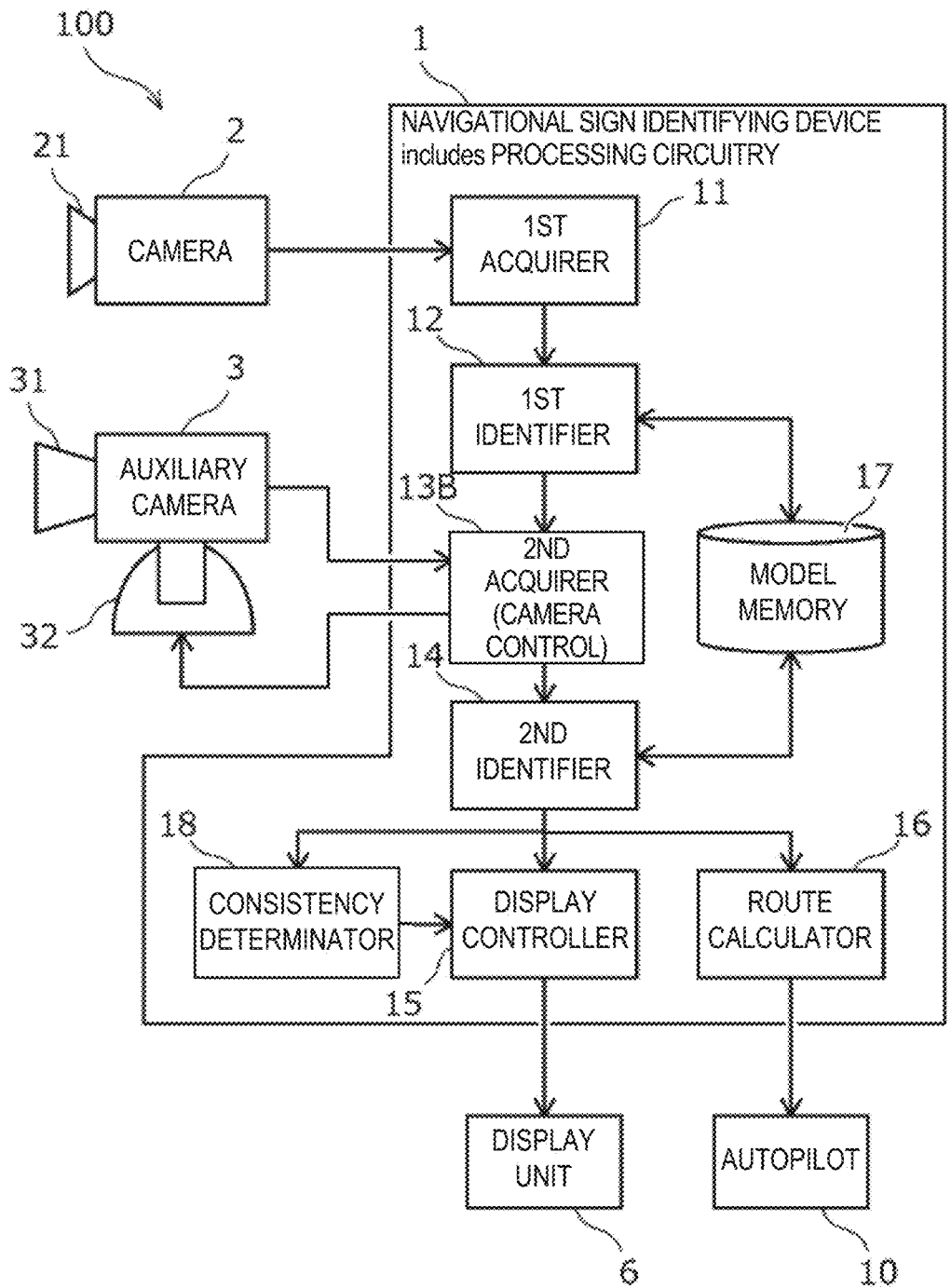
FIG. 13 is a block diagram illustrating still another example of the configuration of the navigational sign identifying device.

Further, as illustrated in FIG. 13, the second acquirer 13B may be a camera controller which acquires the second image by causing an auxiliary camera 3 which is higher in resolution than the camera 2 to image an area of the real space corresponding to the partial area of the first image. Thus, by utilizing the auxiliary camera 3, the second image which is higher in resolution than the first image may be acquired.

The auxiliary camera 3 may include, similarly to the camera 2 illustrated in FIG. 3, a lens part 31 which realizes the optical zoom function, and a pan/tilt mechanism 32 which realizes the pan/tilt function. The lens part 31 of the auxiliary camera 3 may be higher in magnification than the lens part 21 of the camera 2.

First Modification

Below, a first modification is described. For the configuration and the processing which overlap with the above embodiment, detailed description may be omitted by assigning the same reference character.

The interpretation of the lateral buoy may be opposite between the port sign and the starboard sign depending on the country. Thus, in this modification, the port sign and the starboard sign may be identified or discriminated without depending on the ship positioning, as described below.

Figure 14:
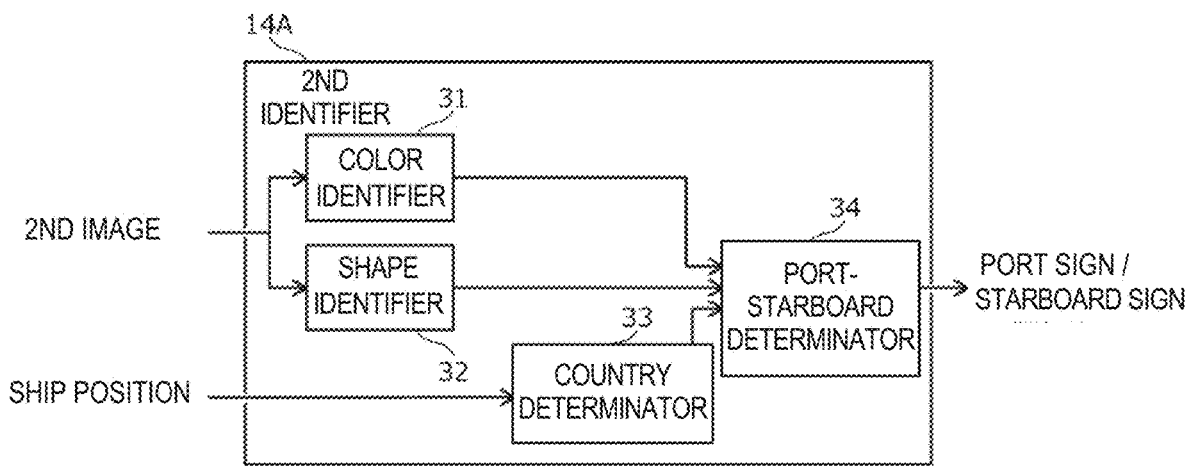
FIG. 14 is a block diagram illustrating one example of a configuration of a second identifier according to a first modification.

FIG. 14 is a block diagram illustrating one example of a configuration of a second identifier 14A according to the first modification. This drawing mainly illustrates a function part for identifying the description of the sign of the lateral buoy, among function parts realized by the second identifier 14A.

The second identifier 14A may include a color identifier 31, a shape identifier 32, a country determinator 33, and a port-starboard determinator 34. The color identifier 31 and the shape identifier 32 are examples of a mode identifier.

When the classification of the buoy identified by the first identifier 12 (classification identifier) illustrated in FIG. 3 is a lateral buoy, the function part of the second identifier 14A may identify the description of the sign of the lateral buoy included in the second image P2 (see FIG. 6).

Figure 15:
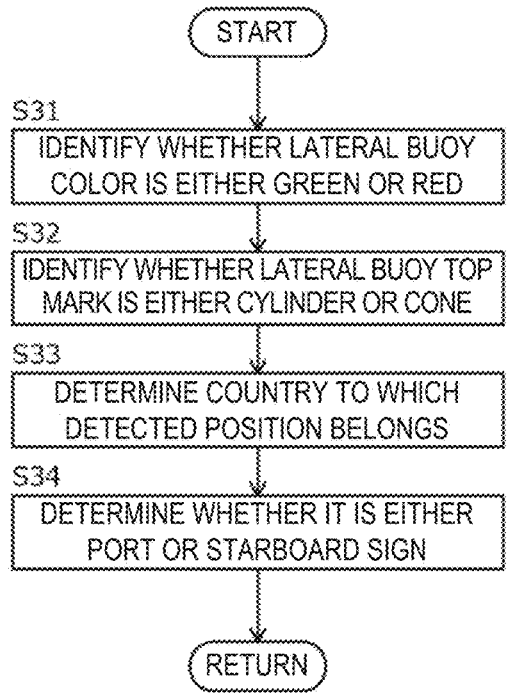
FIG. 15 is a flowchart illustrating an example procedure of a port-starboard sign identification processing.

FIG. 15 is a flowchart illustrating an example procedure of a port-starboard sign identification processing S22 according to the first modification, which is realized by the second identifier 14A. The navigational sign identifying device 1 may perform the information processing illustrated in this drawing according to the program.

The navigational sign identification processing S22 may correspond to S22 illustrated in FIG. 8. That is, the navigational sign identifying device 1 may perform the port-starboard sign identification processing S22, when the classification of the buoy identified at S12 illustrated in FIG. 7 is a lateral buoy.

First, the navigational sign identifying device 1 may identify whether the color of the lateral buoy included in the second image P2 is either green or red (S31: processing as the color identifier 31). Green and red are examples of a first mode and a second mode.

Next, the navigational sign identifying device 1 may identify whether the top mark of the lateral buoy included in the second image P2 is either a cylinder shape or a cone shape (S32: processing as the shape identifier 32). The cylinder shape and the cone shape are examples of the first mode and the second mode.

The identification of the color and the identification of the shape of the top mark may be performed using the learned model, similarly to the above embodiment. For example, the learned model which identifies both the color and the shape of the top mark may be used, or the learned model which identifies the color and the learned model which identifies the shape of the top mark may be used separately.

Next, the navigational sign identifying device 1 may determine the country to which the detected position of the ship detected by the GNSS receiver 7 (see FIG. 1) belongs (S33: processing as the country determinator 33). For example, the navigational sign identifying device 1 may determine which country's territorial water the coordinates of the detected position of the ship are included based on the nautical chart data.

Next, the navigational sign identifying device 1 may refer to a by-country port-starboard mode table and determine whether the description of the sign of the lateral buoy is either the port sign or the starboard sign based on the color identified at S31, the shape of the top mark identified at S32, and the country determined at S33 (S34: processing as the port-starboard determinator 34).

Figures 16, 17:
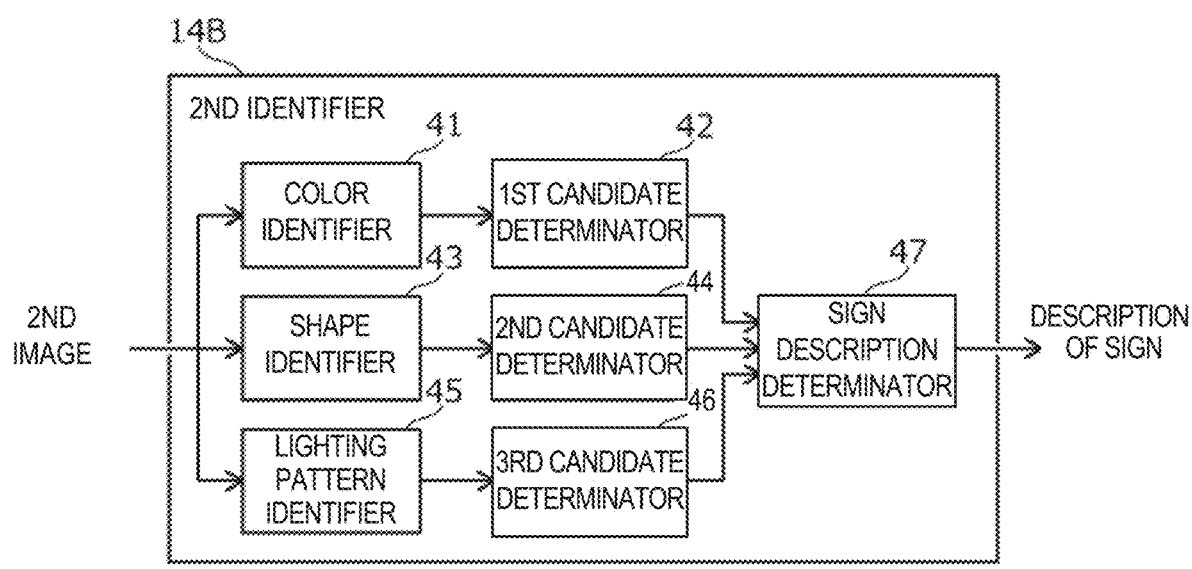
FIG. 16 is a view illustrating one example of a by-country port-starboard mode table.
FIG. 17 is a block diagram illustrating one example of a configuration of a second identifier according to a second modification.

FIG. 16 is a view illustrating one example of the by-country port-starboard mode table. The by-country port-starboard mode table may be a table indicative of a correspondence relationship between the mode of the buoy and the description of the sign, and may be provided to the nonvolatile memory of the navigational sign identifying device 1.

In detail, the by-country port-starboard mode table may indicate whether green or red in the color of the lateral buoy corresponds to either one of the port sign and the starboard sign in each country. Further, the by-country port-starboard mode table may indicate whether the cylinder shape or the cone shape of the top mark corresponds to either one of the port sign and the starboard sign in each country.

According to the first modification described above, it becomes possible to discriminate or identify the port sign and the starboard sign based on the description of the sign of the lateral buoy, without depending on the ship position.

Second Modification

Hereinafter, a second modification is described. For the configuration and the processing which overlap with the above embodiment, detailed description may be omitted by assigning the same reference character.

The classification of the buoy and the description of the sign may be identifiable or discriminable based on the elements, such as the color of the buoy, the shape of the top mark, and the lighting pattern. However, when directly identifying or discriminating the description of the sign based on the image, the contribution of each element may not be known, and therefore, the identification or discrimination accuracy may not be sufficient. Thus, in this modification, the accuracy of identifying the description of the sign is improved, as described below.

FIG. 17 is a block diagram illustrating one example of a configuration of a second identifier 14B according to the second modification. The second identifier 14B may include a color identifier 41, a first candidate determinator 42, a shape identifier 43, a second candidate determinator 44, a lighting pattern identifier 45, a third candidate determinator 46, and a sign description determinator 47.

Figure 18:
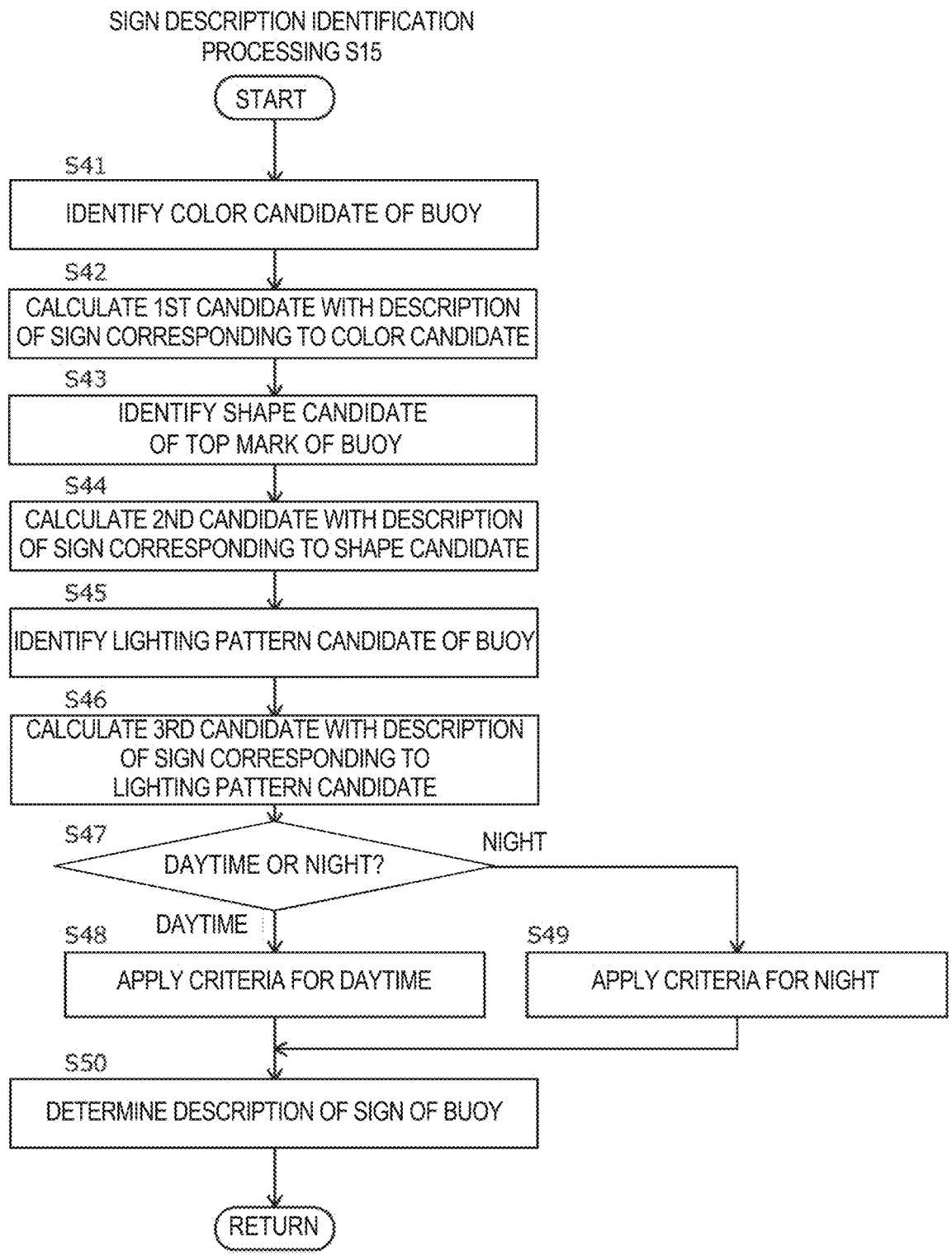
FIG. 18 is a flowchart illustrating an example procedure of the sign description identification processing.

FIG. 18 is a flowchart illustrating an example procedure of a sign description identification processing S15 according to the second modification, which is realized by the second identifier 14B. The navigational sign identifying device 1 may perform the information processing illustrated in this drawing according to the program. The sign description identification processing S15 may correspond to S15 illustrated in FIG. 7.

FIG. 19 is a view illustrating the color, the shape of the top mark, and the lighting pattern corresponding to the description of the sign of the buoy. The description of the sign of the buoy may be classified according to the color of the buoy, the shape of the top mark, and the lighting pattern. The lighting pattern may be a temporal pattern of turning on and off of light.

As illustrated in FIG. 18, the navigational sign identifying device 1 may first identify a color candidate of the buoy included in the second image P2 (S41: processing as the color identifier 41). In detail, the navigational sign identifying device 1 may identify the color candidate of the buoy in the second image P2 by using the learned model. Further, the navigational sign identifying device 1 may calculate a first probability indicative of the probability of the color candidate, along with the color candidate.

Next, the navigational sign identifying device 1 may determine a first candidate of the description of the sign of the buoy corresponding to the identified color candidate (S42: processing as the first candidate determinator 42). In detail, the navigational sign identifying device 1 may determine the description of the sign corresponding to the color candidate as the first candidate, while referring to the table indicative of the correspondence relationship between the color and the description of the sign.

Next, the navigational sign identifying device 1 may identify a shape candidate of the top mark of the buoy included in the second image P2 (S43: processing as the shape identifier 43). In detail, the navigational sign identifying device 1 may identify the shape candidate of the top mark of the buoy in the second image P2 by using the learned model. Further, the navigational sign identifying device 1 may calculate a second probability which indicates the probability of the shape candidate, along with the shape candidate.

Next, the navigational sign identifying device 1 may determine a second candidate of the description of the sign of the buoy corresponding to the identified shape candidate (S44: processing as the second candidate determinator 44). In detail, the navigational sign identifying device 1 may determine the description of the sign corresponding to the shape candidate as the second candidate, while referring to the table indicative of the correspondence relationship between the shape and the description of the sign.

Next, the navigational sign identifying device 1 may identify a lighting pattern candidate of the buoy from the plurality of time-series second images P2 (S45: processing as lighting pattern identifier 45). The navigational sign identifying device 1 may identify the lighting pattern candidate of the buoy according to a given rule.

In detail, the navigational sign identifying device 1 may extract the temporal pattern of turning on and off of the light of the buoy from the plurality of time-series second images P2, and select a standard temporal pattern which is most similar to the extracted temporal pattern from a plurality of standard temporal patterns stored beforehand, as the lighting pattern candidate. The standard temporal pattern may be created based on the lighting pattern of the description of the sign (see FIG. 19).

Further, the navigational sign identifying device 1 may calculate a third probability indicative of the probability of the lighting pattern candidate, along with the lighting pattern candidate. In detail, the navigational sign identifying device 1 may calculate the similarity of the extracted temporal pattern to the standard temporal pattern which is the lighting pattern candidate, as the third probability.

Next, the navigational sign identifying device 1 may determine a third candidate of the description of the sign of the buoy corresponding to the identified lighting pattern candidate (S46: processing as the third candidate determinator 46). In detail, the navigational sign identifying device 1 may determine the description of the sign corresponding to the standard temporal pattern which is the lighting pattern candidate, as the third candidate.

Next, the navigational sign identifying device 1 may determine whether the present time is either daytime or night (S47), and if it is daytime, it may apply a criteria for daytime (S48), and if it is night, it may apply a criteria for night (S49). The present time may be a time at which the image is generated by the camera 2. The criteria may be for determining the description of the sign of the buoy.

Next, the navigational sign identifying device 1 may determine the description of the sign of the buoy based on the first candidate of the description of the sign determined at S42, the second candidate of the description of the sign determined at S44, and the third candidate of the description of the sign determined at S46 (S50: processing as the sign description determinator 47).

In detail, if at least two of the first candidate, the second candidate, and the third candidate are the same description of the sign, the navigational sign identifying device 1 may determine the same description of the sign as the description of the sign of the buoy. For example, if two of the first candidate, the second candidate, and the third candidate are the port signs, and the remaining one is the starboard sign, the port sign may be determined as the description of the sign.

Further, the navigational sign identifying device 1 may determine the description of the sign of the buoy based on the first probability, the second probability, and the third probability. For example, a candidate corresponding to the highest probability among the first probability, the second probability, and the third probability may be determined as the description of the sign. Further, when the plurality of candidates indicate the same description of the sign, the probability corresponding to them may be added up.

The navigational sign identifying device 1 may use different weights, which are given to the first probability, the second probability, and the third probability daytime, respectively, between the criteria for daytime and the criteria for night. For example, it may give priority to a candidate according to the color of the buoy and the shape of the top mark which are easily visible in a bright environment during daytime, and give priority to a candidate according to the lighting pattern of the buoy which is easily visible also in a dark environment during night.

That is, in the criteria for daytime, the weights of the first and second probabilities according to the color of the buoy and the shape of the top mark may be made higher than the weight of the third probability according to the lighting pattern of the buoy. On the contrary, in the criteria for night, the weight of the third probability according to the lighting pattern of the buoy may be made higher than the weights of the first and second probabilities according to the color of the buoy and the shape of the top mark.

Note that the technique for determining the description of the sign according to this modification may be applied not only to the lateral sign and the directional sign but also to the isolated obstruction sign, the safe water area sign, and the special sign.

Although the embodiment of the present disclosure is described above, the present disclosure is not limited to the above embodiment, and it is needless to say that various changes are possible for the person skilled in the art.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE CHARACTERS

1 Navigational Sign Identifying Device, 2 Camera, 3 Radar, 4 AIS, 5 Radio Communicator, 6 Display Unit, 7 GNSS Receiver, 8 Gyrocompass, 9 ECDIS, 10 Autopilot, 11 First Acquirer, 12 First Identifier, 13 Second Acquirer, 14 Second Identifier, 15 Display Controller, 16 Route Calculator, 17 Model Memory, 21 Lens Part, 22 Pan/Tilt Mechanism, 31 Color Identifier, 32 Shape Identifier, 33 Country Determinator, 34 Port-starboard Determinator, 41 Color Identifiers, 42 First Candidate Determinator, 43 Shape Identifier, 44 Second Candidate Determinator, 45 Lighting Pattern Identifier, 46 Third Candidate Determinator, 47 Sign Description Determinator, 100 Autonomous Cruising System

The invention claimed is:

1. An autonomous cruising system, comprising:
processing circuitry configured to:
   acquire a first image including a buoy from a camera installed in a ship,
   identify a position of the buoy inside the first image;
   acquire a second image corresponding to a partial area of the first image including the position of the buoy, the second image being higher in resolution than the first image;
   identify a color candidate, a shape candidate, and a lighting pattern candidate of the buoy in the second image; and
   identify description of a sign of the buoy based on the color candidate, the shape candidate, and the lighting pattern candidate of the buoy in the second image, wherein
a greater weight is assigned to the lighting pattern candidate relative to the color and shape candidates during nighttime conditions.

2. The autonomous cruising system of claim 1, wherein the camera has an optical zoom function, and
wherein the processing circuitry causes the camera to magnify and image a range corresponding to the partial area of the first image to acquire the second image.

3. The autonomous cruising system of claim 2, wherein the camera has a pan/tilt function, and
wherein the processing circuitry directs an imaging direction of the camera toward the range corresponding to the partial area of the first image based on the position of the buoy.

4. The autonomous cruising system of claim 1, wherein the processing circuitry acquires the second image by increasing the resolution of the partial area of the first image.

5. The autonomous cruising system of claim 1, wherein the processing circuitry acquires the second image by causing an auxiliary camera to image the range corresponding to the partial area of the first image, the auxiliary camera being higher in resolution than the camera.

6. The autonomous cruising system of claim 1, wherein the processing circuitry:
   identifies the position of the buoy inside the first image by using a first learned model, and
   identifies the description of the sign of the buoy based on the second image by using a second learned model.

7. The autonomous cruising system of claim 6, wherein the first learned model and the second learned model are formed by incorporating a first learned parameter and a second learned parameter into a common inference program, respectively, the first learned parameter and the second learned parameter being different from each other.

8. The autonomous cruising system of claim 1, wherein the processing circuitry further identifies a classification of the buoy.

9. The autonomous cruising system of claim 8, wherein, when the classification of the buoy is a lateral sign, the processing circuitry identifies whether the description of the sign of the buoy is either one of a port sign and a starboard sign.

10. The autonomous cruising system of claim 8, wherein, when the classification of the buoy is a directional sign, the processing circuitry identifies whether the description of the sign of the buoy is either one of a North sign, an East sign, a South sign, and a West sign.

11. The autonomous cruising system of claim 1, wherein, when the classification of the buoy is a lateral sign, the processing circuitry identifies whether the description of the sign of the buoy is either one of the port sign and the starboard sign, by using a learned model for lateral signs, and when the classification of the buoy is a directional sign, the processing circuitry identifies whether the description of the sign of the buoy is either one of a North sign, an East sign, a South sign, and a West sign, by using a learned model for directional signs.

12. The autonomous cruising system of claim 1, wherein the processing circuitry does not acquire the second image, when the classification of the buoy is any one of an isolated obstruction sign, a safe water area sign, and a special sign.

13. The autonomous cruising system of claim 1, wherein, when a plurality of buoys are identified from the first image, the processing circuitry performs the acquisition of the second image and the identification of the description of the sign for each of the plurality of buoys, respectively.

14. The autonomous cruising system of claim 1, wherein the processing circuitry is further configured to display a symbol indicative of the description of the sign of the buoy in any one of the first image, an electronic nautical chart, and a radar image based on the description of the sign of the buoy, the position of the buoy inside the first image, and an imaging direction of the camera.

15. The autonomous cruising system of claim 1, wherein the processing circuitry is further configured to determine consistency of the description of the sign of the buoy with description of the sign indicated by navigational sign data recorded on an electronic nautical chart, based on the description of the sign of the buoy, the position of the buoy inside the first image, an imaging direction of the camera, and a position of the ship.

16. The autonomous cruising system of claim 15, wherein the processing circuitry is further configured to display a determination result of the consistency in any one of the first image, the electronic nautical chart, and a radar image.

17. The autonomous cruising system of claim 1, wherein the processing circuitry is further configured to calculate one of a route of the ship and a width of the route based on the position of the buoy inside the first image and an imaging direction of the camera, when the description of signs of a plurality of buoys includes at least two of a port sign, a starboard sign, and a safe water area sign.

18. The autonomous cruising system of claim 1, wherein the processing circuitry is further configured to:
   detect a heading of the ship, and
   set a direction in which the ship is to travel, based on the description of the sign of the buoy, an imaging direction of the camera, and the heading of the ship.

19. A method of identifying a navigational sign, comprising the steps of:
- acquiring a first image including a buoy from a camera installed in a ship;
- identifying a position of the buoy inside the first image;
- acquiring a second image corresponding to a partial area of the first image including the position of the buoy, the second image being higher in resolution than the first image;
- identifying a color candidate, a shape candidate, and a lighting pattern candidate of the buoy in the second image; and
- identifying description of a sign of the buoy based on the color candidate, the shape candidate, and the lighting pattern candidate of the buoy in the second image, wherein
- a greater weight is assigned to the lighting pattern candidate relative to the color and shape candidates during nighttime conditions.

20. A non-transitory computer-readable medium having stored thereon computer-executable instructions which, when executed by a computer, cause the computer to:
- acquire a first image including a buoy from a camera installed in a ship;
- identify a position of the buoy inside the first image;
- acquire a second image corresponding to a partial area of the first image including the position of the buoy, the second image being higher in resolution than the first image; and
- identify a color candidate, a shape candidate, and a lighting pattern candidate of the buoy in the second image; and
- identify description of a sign of the buoy based on the color candidate, the shape candidate, and the lighting pattern candidate of the buoy in the second image, wherein
- a greater weight is assigned to the lighting pattern candidate relative to the color and shape candidates during nighttime conditions.

* * * * *